(12) United States Patent
Vetter

(10) Patent No.: US 10,070,532 B2
(45) Date of Patent: Sep. 4, 2018

(54) PRINTED CIRCUIT BOARD FABRICATION PROCESSES AND ARCHITECTURE INCLUDING POINT-OF-USE DESIGN AND FABRICATION CAPACITY EMPLOYING ADDITIVE MANUFACTURING

(71) Applicant: The United States of America as represented by the Secretary of the Navy, Washington, DC (US)

(72) Inventor: Stephen J. Vetter, Orleans, IN (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 218 days.

(21) Appl. No.: 15/141,366

(22) Filed: Apr. 28, 2016

(65) Prior Publication Data

US 2016/0324006 A1   Nov. 3, 2016

Related U.S. Application Data

(60) Provisional application No. 62/153,935, filed on Apr. 28, 2015.

(51) Int. Cl.
| | |
|---|---|
| *H05K 3/30* | (2006.01) |
| *H05K 3/00* | (2006.01) |
| *H05K 3/12* | (2006.01) |
| *G06F 17/50* | (2006.01) |
| *H05K 1/11* | (2006.01) |
| *H05K 3/40* | (2006.01) |

(52) U.S. Cl.
CPC ....... *H05K 3/0005* (2013.01); *G06F 17/5068* (2013.01); *H05K 3/1258* (2013.01); *G06F 2217/12* (2013.01); *H05K 1/115* (2013.01); *H05K 3/0047* (2013.01); *H05K 3/306* (2013.01); *H05K 3/4069* (2013.01); *H05K 2201/09036* (2013.01); *H05K 2203/0278* (2013.01); *Y02P 90/265* (2015.11); *Y10T 29/4913* (2015.01)

(58) Field of Classification Search
CPC ...... H05K 3/326; H05K 3/4664; H05K 1/115; H05K 3/0005; H05K 3/0047; H05K 3/4644; H05K 3/4661; Y10T 29/49155; Y10T 29/49124; Y10T 29/49126; Y10T 29/4913; Y10T 29/49165
USPC ......... 29/832, 739, 825, 829, 830, 831, 837, 29/846
See application file for complete search history.

(56) References Cited

U.S. PATENT DOCUMENTS

| | | | | |
|---|---|---|---|---|
| 5,442,545 A | * | 8/1995 | Matsui ............... | G06Q 10/0875 700/110 |
| 7,546,571 B2 | * | 6/2009 | Mankin ............... | G06F 17/5045 700/103 |
| 2008/0052904 A1 | * | 3/2008 | Schneider ............ | H01L 21/486 29/846 |

* cited by examiner

*Primary Examiner* — Thiem Phan
(74) *Attorney, Agent, or Firm* — Christopher A. Monsey

(57) ABSTRACT

Apparatus and methods are provided which enable a capacity to remotely enable research, development, and production tasks to be done at a point of use (POU) as well as permitting some design tasks to be done remotely with manufacturing employing, for example, additive manufacturing (AM), for printed circuit boards (PCB) as well as other electrical items. In particular, some embodiments are directed towards facilitating POU on-site manufacturing capacity with a remote or distributed requirements/design process.

9 Claims, 21 Drawing Sheets

| PROPERTY 171 | FR4 173 | NYLON 12 175 | ABS 177 | UNIT 179 |
|---|---|---|---|---|
| Type | Thermal Set | Thermal Plastic | Thermal Plastic | - |
| Dielectric Constant | 4 to 5 | 2 to 3 | 3 to 4 | n/a |
| Dissipation Factor | 0.02 | 0.08 | 0.14 | n/a |
| Dielectric Strength | 800-900 | 55 | 130 | V/mil |
| Melt Temp/Tg | 170 | 190-200 | 125 | °C |
| Water Absorption | 0.1 | 0.2 | 0.3 | % |
| CTE (Z) | 70 | 80 | 6.7 | ppm/°F |
| Flame Retardant | Yes | Yes | Yes | n/a |

Fig. 6

| PROPERTY | TYPE | | | FOIL | UNIT |
| --- | --- | --- | --- | --- | --- |
| Conductor | Silver | Copper | Copper/Tin | Copper | - |
| Sheet Resistivity | 3 to 5 | 20 to 30 | 15 | 0.5 | mΩ/sq/mil |
| Cure | Thermal | Thermal | Sintered | n/a | - |
| CTE | 35 | 25 | 22 | 18 | ppm/°C |
| Working Life | >1 | 2 | 8 | n/a | Hours |
| Shelf Life | 6 | 3 | >12 | n/a | Months |
| Storage Condition | <25 | 0-5 | <-10 | n/a | °C |
| Equivalent Width | 6x to 10x | 40x to 60x | 30x | - | Inches |

303 — Create a first printed circuit board (PCB) design with electronic computer aided design (CAD) tools on a PCB design and manufacturing computer (PCBDMC) with a software read/write hard drive, display, input/output system, processor, etc at a point of use (POU) or a remote location and saving resulting first data into a first data file (PCB data e.g., a Gerber file such as a RS274X, ODB++, or IPC-2581 formats), comprising a plurality of first data including electrical component footprints comprising electrical interfaces and PCB design elements comprising interconnection lists (net list), pad stacks, the PCB design profile geometry including the electrical component footprints (e.g., X,Y locations of conductive pad and conductor line shapes), and electrical component hole diameters associated with the conductive pad shape locations.

Fig. 11A

305 — At the POU, executing CAM software and generating a second data and second data file comprising the first data in said first data file to a computer aided manufacturing (CAM) software, e.g., (CAM 350 by Downstream, Genesis by Valor, etc used for generating, designing, and manipulating PCB data) on the PCBDMC and then executing the CAM software on said first data, said CAM software comprising a Design Rule Check (DRC) and a Design for Manufacturability (DFM) analysis software comprising a plurality of DRC rules and DFM rules adapted to search for specified or predetermined PCB design elements associated with one or more PCB additive manufacturing (AM) design flaws or risks in one or more DRC and DFM rules in said first data (e.g., if A and B AM PCB element(s) design flaws are matched in the first data, then generate one or more DRC or DFM flags comprising one or more specific AM design risk or flaw warning and accompanying said PCB design elements triggering the rule execution) where the CAM software rules are executed by a rule engine in said DRC and DFM analysis software on said first data, the CAM software generating said second data comprising said one or more design risk or flaw warnings associated with respective first data PCB elements having said one or more design risk or flaws, wherein processing can continue either by reopening said first data file in said CAD tools and altering the first data to change the first PCB design to eliminate the design risk or flaws then repeating step 305 or executing the CAM software that further comprises a module that provides a user interface to enable changes to the first data file to eliminate the design risks or flaw warnings, then generating a second data file comprising a modified AM optimized PCB design including said altered first data having first PCB elements with design risks or flaws removed comprising information and file elements such as shown in, e.g., Fig. 13.

307 — Panelizing and saving said modified AM optimized PCB design comprising, e.g., elements shown or associated with elements in Fig. 13, for manufacturing with an AM system (step and repeat parts in an array structure optimizing utilization) using the CAM software on the PCBDMC so as to place the modified AM optimized PCB design elements on different AM plate sections of the AM system into the second data file.

Fig. 11B

Build Conductor Structure in Design Software

Build Substrate in Design Software

Add negative conductor to substrate structure

Combine Conductor Structure to Substrate in Design Software

PRINTED CIRCUIT BOARD FABRICATION PROCESSES AND ARCHITECTURE INCLUDING POINT-OF-USE DESIGN AND FABRICATION CAPACITY EMPLOYING ADDITIVE MANUFACTURING

CROSS-REFERENCE TO RELATED APPLICATIONS

The present application claims priority to U.S. Provisional Patent Application Ser. No. 62/153,935, filed Apr. 28, 2015, entitled "PRINTED CIRCUIT BOARD FABRICATION PROCESSES AND ARCHITECTURE INCLUDING POINT-OF-USE DESIGN AND FABRICATION CAPACITY EMPLOYING ADDITIVE MANUFACTURING," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,229) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

The present invention relates to a capacity to remotely enable research, development, and production tasks to be done on site or permit up to all tasks except manufacturing to be done remotely employing, for example, additive manufacturing (AM) for printed circuit boards as well as other electrical items. In particular, some embodiments are directed towards facilitating point-of-use (POU) on-site manufacturing capacity with a remote or distributed requirements/design process.

Supplying electrical and other types of similar equipment such as printed circuit boards (PCB) to remote or POU locations face a variety of challenges. One factor is acquisition lead time—once concept design is complete, obtaining prototypes for testing and evaluating is time consuming and difficult in remote locations. Various specialties needed to conduct requirements analysis, as well as designing, producing, testing, and manufacturing various components, are frequently not found in one location. Another factor is that PCBs require extensive dedicated PCB fabrication facilities because PCB fabrication is a specialized process with industry unique equipment and materials. A current approach to production of PCBs cannot be accomplished at or on temporary or mobile locations, such as ships, land vehicles, construction sites, spacecraft, underwater facilities, ocean oil wells, or Antarctic locations or shelters, etc. Another problem with manufacturing PCBs off site includes transportation logistics (such as shipping and warehousing). Thus, a need exists for manufacturing PCBs at POU locations, while at the same time, shortening design and production time, and reducing facilities and materials.

AM is being examined to solve these problems. However, there still remain many technical difficulties and gaps in AM capabilities and equipment. For example, no AM system exists that can produce a start-to-finish electrical system or component, such as a PCB, at a POU location.

Another challenge is that technical development relative to AM and PCBs has focused on production of PCB additive materials that are created with single-use AM printers, which are not suitable for multiple-application use. In other words, single-use AM printers are similar to a particular manufacturer's inkjet printer, where ink and cartridge designs are specific to the manufacturer—they can't be used for other applications, such as creating tattoos or painting buildings. Many technical problems were discovered during attempts to use general use or mechanical part AM printers with an embodiment of the invention. For example, general use AM systems have different print resolutions and are not ideal for PCB manufacturing. Additionally, process parameters for time and temperature for sintering conductive paste without degrading substrate material was a substantial challenge.

According to an illustrative embodiment of the present disclosure, processes and systems to remotely enable research, development, and production tasks to be done on site or permit up to all tasks except manufacturing to be done remotely employ additive AM to manufacture PCBs and other electrical items. Additionally, exemplary embodiments of systems and processes disclosed in this application provide for facilitating POU or on-site manufacturing capacity with a remote design processes.

According to a further illustrative embodiment of the present disclosure, another embodiment may include processes and systems for facilitating remote or distributed requirements gathering to include mission, capability, operational, interoperability, and system engineering requirements data gathering/analysis, generating of requirements documents and technical data, software, data files followed by design, development, generating required model based engineering (MBE) or digital production files, sending such files via a secure system for POU manufacturing, as well as operational test and evaluation steps. Embodiments can also include a combination of equipment that collectively reduces a number of required manufacturing and test equipment needed to provide some aspects of utility associated with embodiments of the invention. Manufacturing and testing systems can include automated systems as well as use of a combination of manual and automated systems.

Another exemplary embodiment provides a capability to produce emergency repair equipment or spare parts, which do not have to have the same degree of reliability but can provide a temporary or interim functionality while a more robust part is produced. Likewise, another utility that an embodiment of the invention provides is enabling a response to a situation where a system needs to have an on-the-spot or immediate upgrade in capability at an on-site, POU location.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 6 shows a table showing various properties of different materials used with exemplary embodiments of the invention;

FIGS. 11A-11E show another exemplary process in accordance with aspects of an exemplary embodiment of the invention;

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
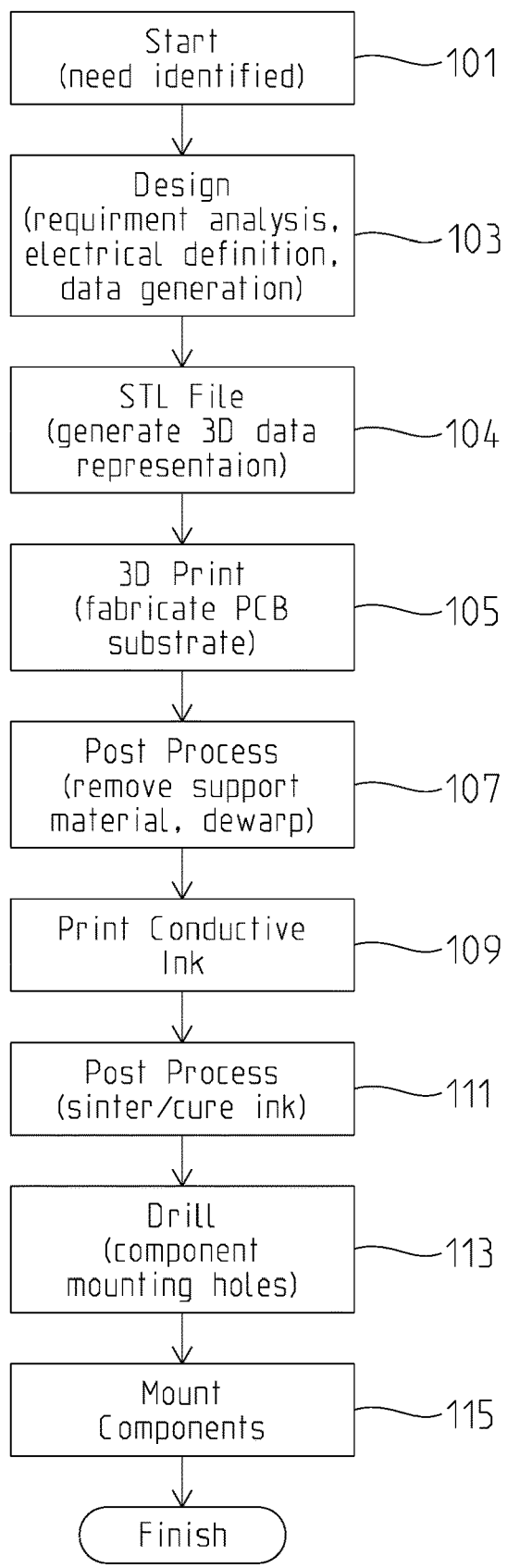
FIG. 1 show a simplified process for executing various steps in accordance with an exemplary embodiment of the invention.

Referring initially to FIG. 1, a simplified process for executing various steps in accordance with an exemplary embodiment of the invention is shown. At step 101, an exemplary process is started based on receipt of a request for engineering and production support at POU location. At step 103, a design effort is accomplished, which includes a requirements analysis process that can be done at a remote site based on the step 101 request as well as collecting additional information from interviews of experts at a remote design site, such as an engineering support center communicating with the POU location personnel. In particular, one example of design steps at step 103 for a two-sided design may include creating AM output product design having a substrate including apertures, such as "trenches" for conductors and "holes" for layer-to-layer interconnects within the substrate. Design steps may be created using one or more CAD tools which output, such as RS274X, ODB++ or IPC-2581 format outputs which are then imported into a PCB computer aided manufacturing (CAM) software (e.g., CAM350 or Valor); next, panelize as necessary; then output design format interchange (DFX) format files for each conductor/pad layer and drill location layer and then import the DFX format files into a mechanical CAD; next, create substrate block, subtract conductor layers with depth extruded on each side, subtract holes through the substrate, subtract pads with depth extruded on both sides of hole. At step 104, a Stereo-Lithographic (STL) file is generated based on inputs and data from the design step 103 using a 3D mechanical CAD software tool. At step 105, based on inputs, such as the STL file, an AM machine is used to engage in AM production activities to create an AM output product (e.g., see FIG. 2), such as an electrical system dielectric substrate with various apertures (e.g. trenches and holes) formed from the AM manufacturing process. Exemplary AM production activities can include Digital Light Processing (DLP), Selective Laser Sintering (SLS), and Multi-Jet-Modeling (MJM). Exemplary processes can use DLP, SLS or MJM to fabricate a PCB substrate structure. For example, the ProJet 3510 HDplus 3D Printer from 3D Systems is such an AM printer utilizing MJM process for high definition printing. At step 107, engaging in a first sequence of post processing, such as specific solvent wash processes required to remove support materials as a byproduct of step 105 and elevated temperature post cure or heat treat with a prescribed cool down rate under pressure to prevent substrate distortion, or an elevated temperature bake followed by an immersion in an ultrasonic water bath at elevated temperatures to remove wax-based support materials. At step 109, engaging in a print conductive ink process, for example, using conductive inks for conductors and plating which creates electrical circuits or patterns on one or more layers or surfaces of the AM output product. An example conductive ink product could include Ormet 265 Sintering Paste. An exemplary conductive ink or paste can include a conductive material, e.g., a metal such as copper and a binding matrix that tightly binds the metal or conductive material that can be applied in a liquid or paste form and which hardens (e.g., via sintering or thermally hardening). At step 109, pushing an electrically conductive paste or ink into the apertures of the AM output product using, e.g., a flexible squeegee structure having a durometer of seventy or higher at step 141 of FIG. 3. Another method is an exemplary design for a mechanism which utilizes a bladder expanded by air pressure (e.g., see FIG. 4) for pushing the conductive ink into the AM apertures. The conductive paste or ink may be inserted into a container that embodies a rubber bladder on one end and an orifice on the other. Air enters the container and pneumatically pushes conductive paste or ink through the orifice to an AM surface. The apertures in the AM substrate 127, 129 and 133 of FIG. 2 become filled with the conductive paste or ink in step 109, shown as filled in 145 and 147 of FIG. 3. At step 111, engaging in another sequence of post processing the conductive paste or ink, such as applying a precise temperature on the paste/substrate output of step 109 in a vacuum oven or inert gas atmosphere for a specific dwell time in order to prevent degradation of the substrate material, using a mechanism adapted for elevated temperature in a vacuum, curing or sintering the paste into the structures or cavities in the AM output product and subsequently removing excess material from the surface through mechanical abrasion. For example, in the case of combining the Ormet 265 Sintering paste used in step 109 and the VisiJet M3 X dielectric substrate AM output from step 105, step 111 can be comprised of applying a precise temperature ramp rate of +4° F. per minute from room ambient to 365° F. to the paste and substrate, holding at 365° F. for a dwell time of 20 minutes, and then decreasing applied temperature at a rate of −4° F. per minute to room ambient all while in a vacuum chamber at an applied pressure of 50 psi. At step 113, a drilling operation on the AM output product occurs. For example, drilling can include drilling through the conductive paste filled apertures with a drill bit diameter smaller than the AM output product cavity diameter, such that a thin wall of conductive paste remains in the AM output product cavity, which emulates a plated through hole for mounting through-hole components, connectors, or grounded mounting holes, creating features suitable for traditional mechanical mounting of leaded electronic components. Milling or laser ablation may also be used to remove either substrate material, paste, or conductive ink to create patterns, features, etc. Conductive ink or other conductive materials or insulating material may be filled in holes, trenches, ablated sections, etc. At step 115, a final mounting of electronic components, as defined by the design in step 103, is performed using tin/lead solder or conductive epoxy to mechanically fix the electronics components and create electrical connection between the electronic components to the output of step 113 in order to complete an electrically functional PCB assembly.

Figure 2:
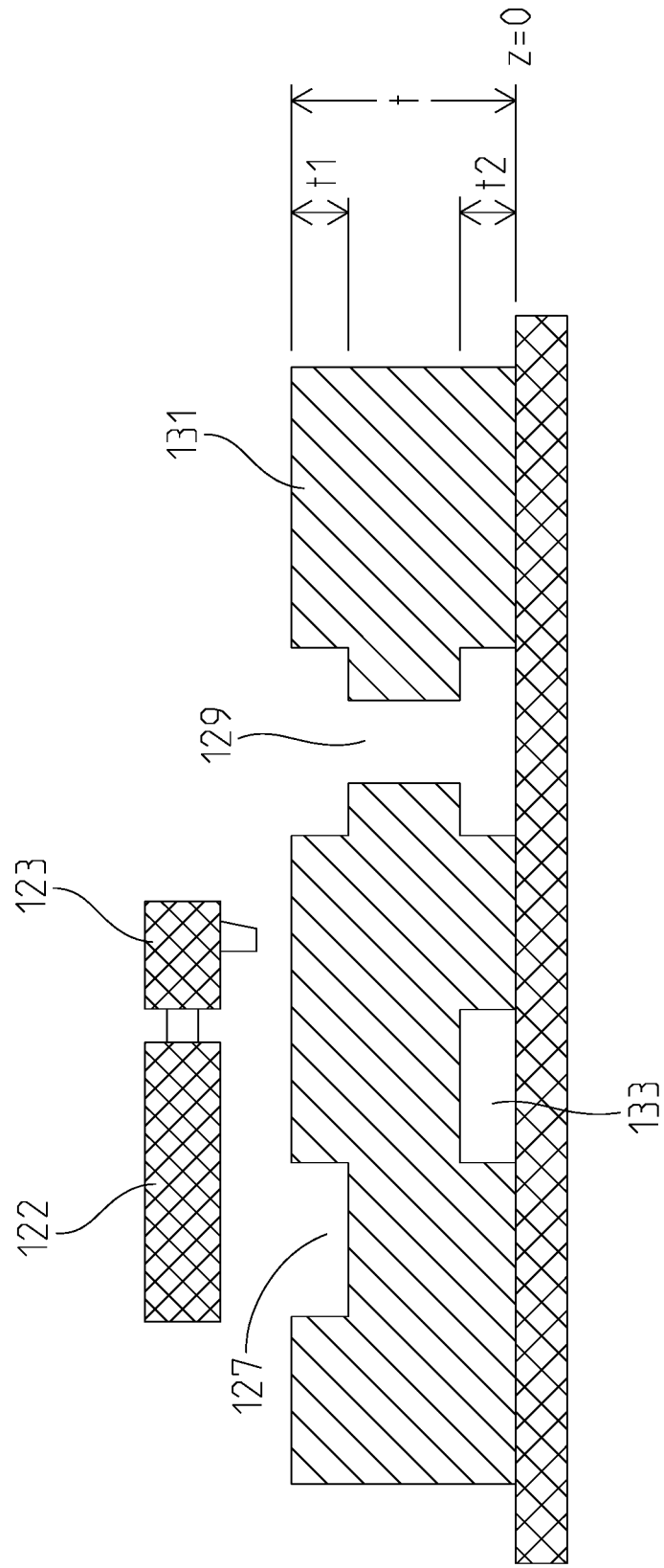
FIG. 2 shows a cross-section of a simplified AM output product of an embodiment of the invention produced from an exemplary process such as, e.g., at FIG. 1.

Referring to FIG. 2, an illustration of a PCB substrate 131 is shown that has been formed by design and AM processes such as described herein prior to application of conductive paste or ink. The PCB substrate 131 is formed with a plurality of apertures or gaps 127, 129, 133. A laser or UV light source 122 and scanner system 123 is positioned and employed to perform a variety of processing steps on the PCB substrate 131 (e.g., curing raw resin of the PCB substrate 131 to harden it after AM process build-up).

Figure 3:
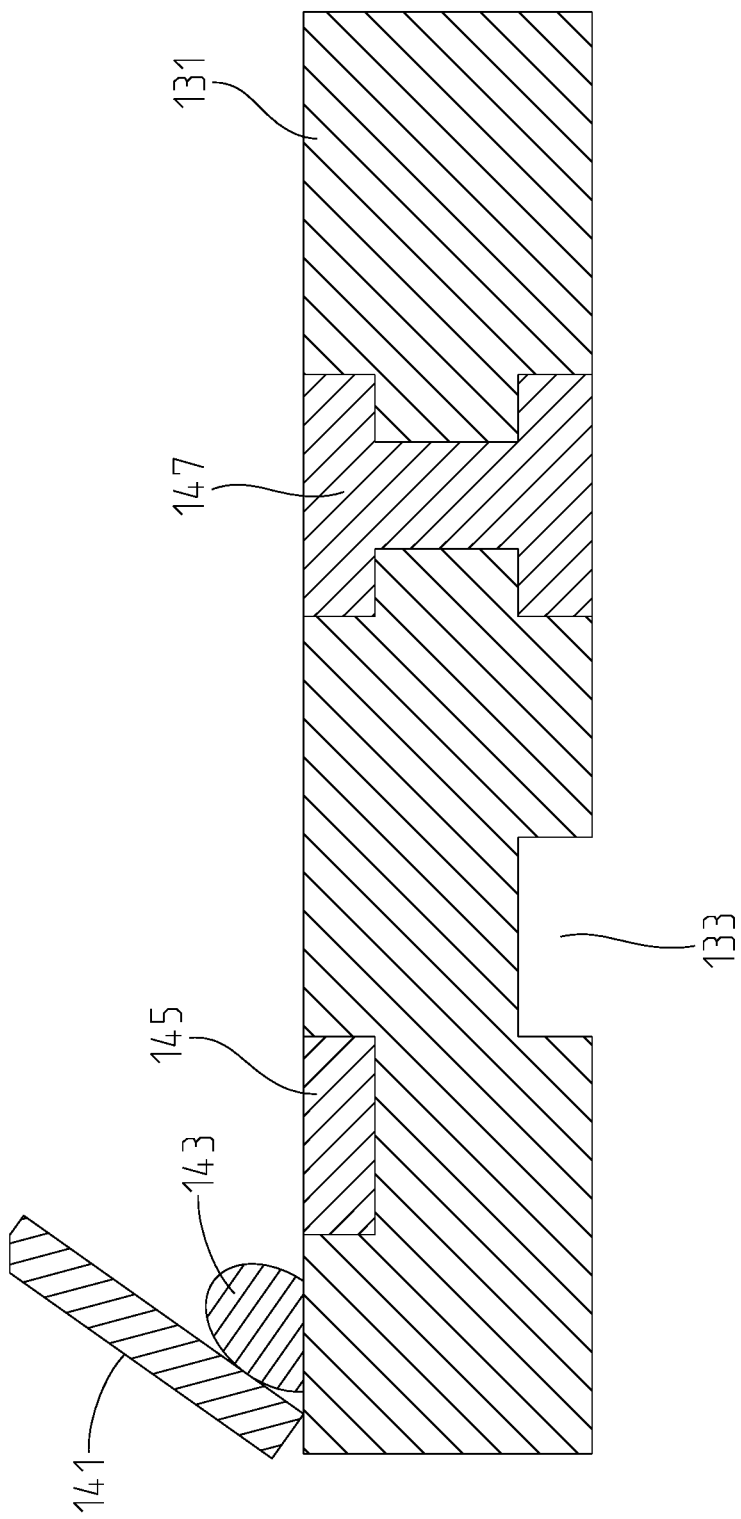
FIG. 3 shows the FIG. 2 cross-section after use of at least a portion of an exemplary process for applying an electrical paste into cavities in the AM output or product to create electrical conductive paths in the AM output.

FIG. 3 shows the FIG. 2 PCB substrate 131 cross section after use of at least a portion of an exemplary process and system to apply an electrically conductive paste 143, into apertures or gaps, such as 133, in evolving AM output or product to create electrically conductive sections 145 and 147 in the AM output product in accordance with an embodiment of the invention. One approach can include use of a squeegee 141 which presses the conductive paste 143 or ink into the plurality of apertures or gaps 127, 129, 133 (e.g., see FIG. 2) to form the electrically conductive sections 145 and 147, while leaving some apertures or gaps, such as 133, without paste. Application of the electrically conductive paste 143 or ink can be an automated or manual process.

Figure 4:
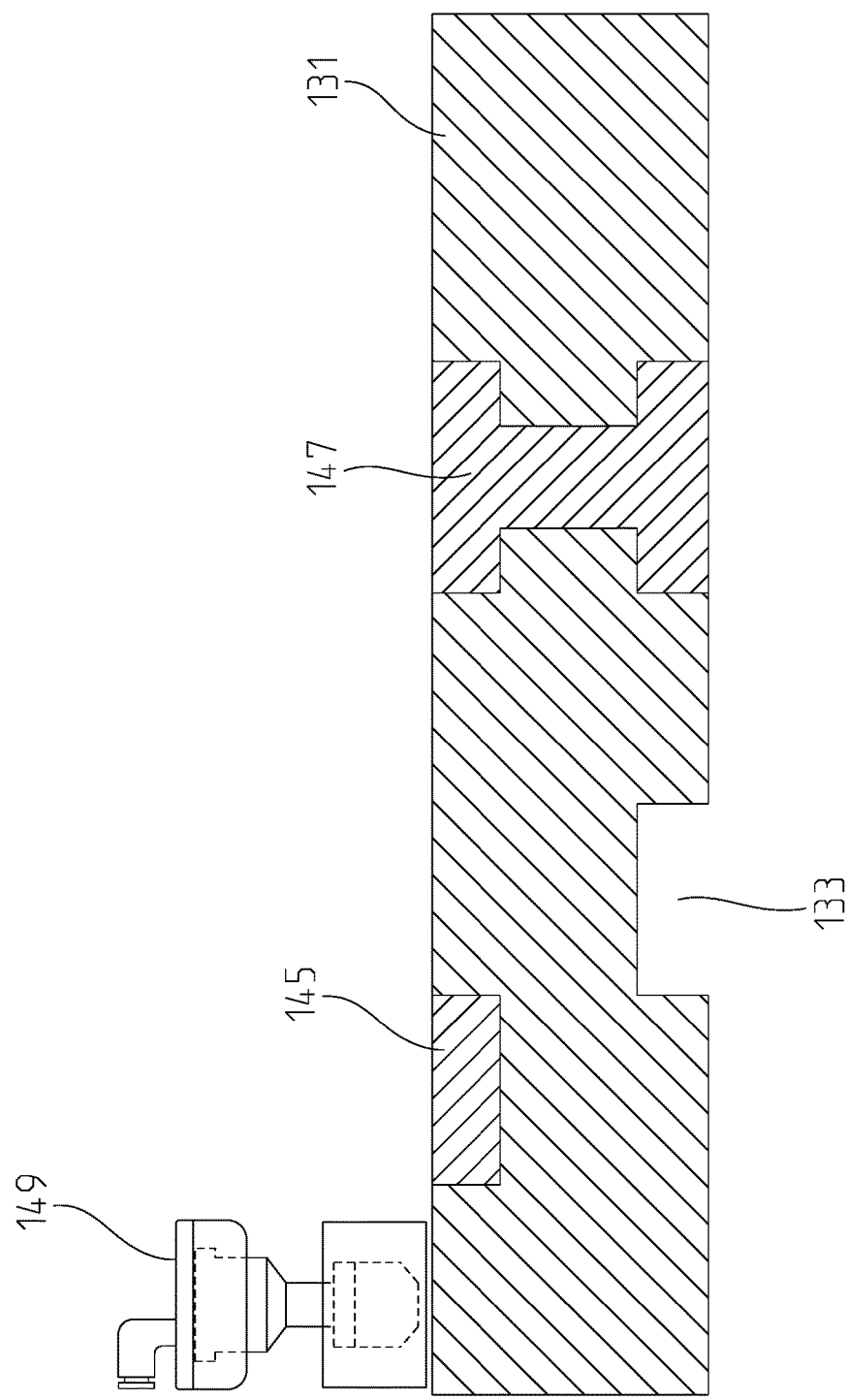
FIG. 4 shows the FIG. 3 cross-section after use of at least another portion of an exemplary approach for applying pressure to the FIG. 3 conductive paste to create electrical conductive paths in the AM output product.

Referring to FIG. 4, an illustration of an alternative method of application of conductive paste and/or ink to form the electrically conductive sections 145 and 147 using a pneumatic device 149 to push the electrically conductive paste or ink to fill apertures or gaps 133 in the PCB substrate 131.

Figure 5:
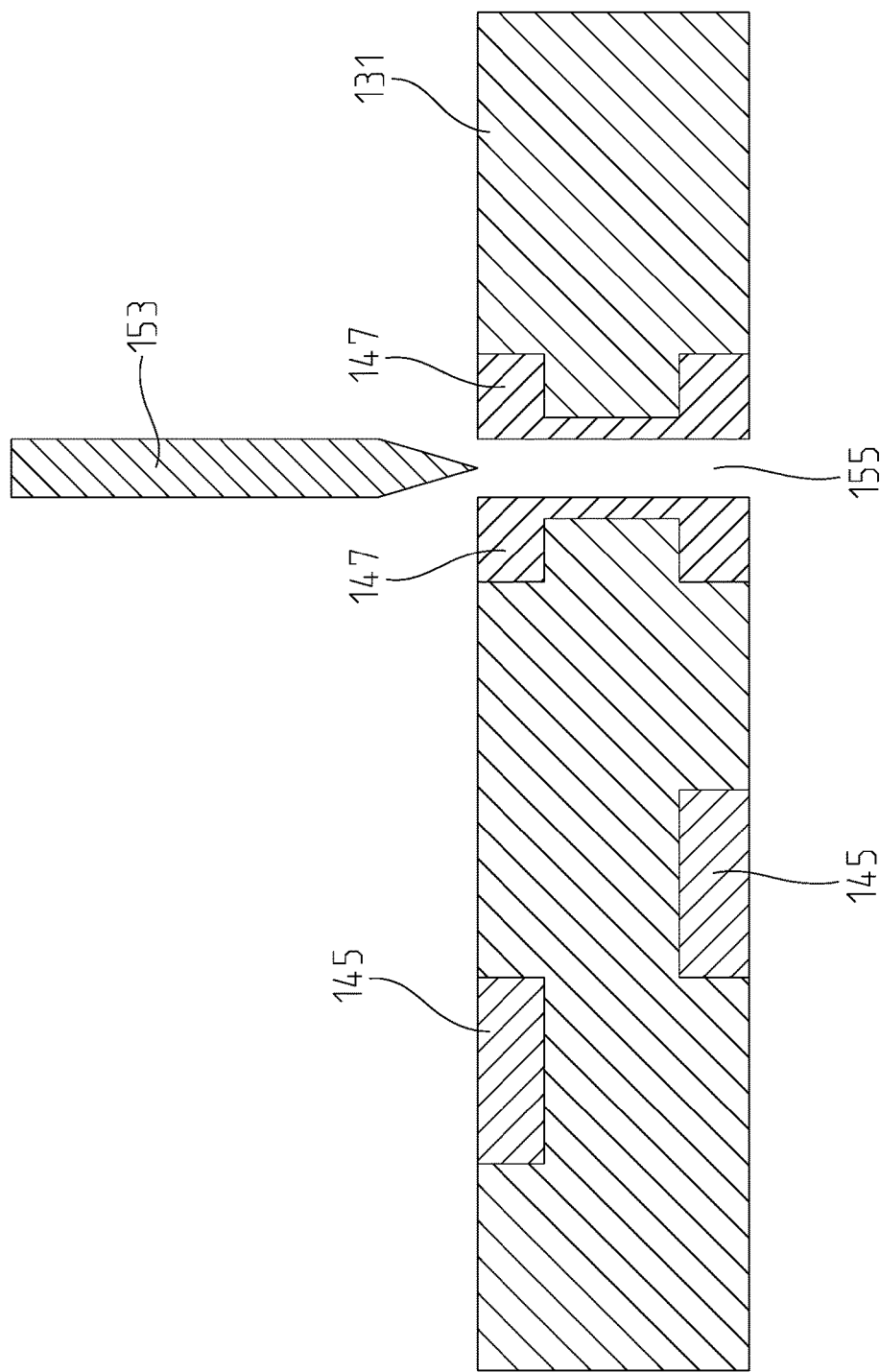
FIG. 5 shows the FIG. 4 cross-section after use of at least another portion of an exemplary approach employing a drill to create electrical conductive paths in the AM output product.

Referring to FIG. 5, an illustration of an exemplary drill process is shown, where a controlled drill machine 153 can be used to drill a hole 155 through the paste or ink filled into one or more electrically conductive sections, e.g., 147, to form a through-hole in hardened ink or paste in the electrically conductive section 147. This structure provides access for mounting "through hole" electronic components into the PCB substrate 131 design.

Figure 7:
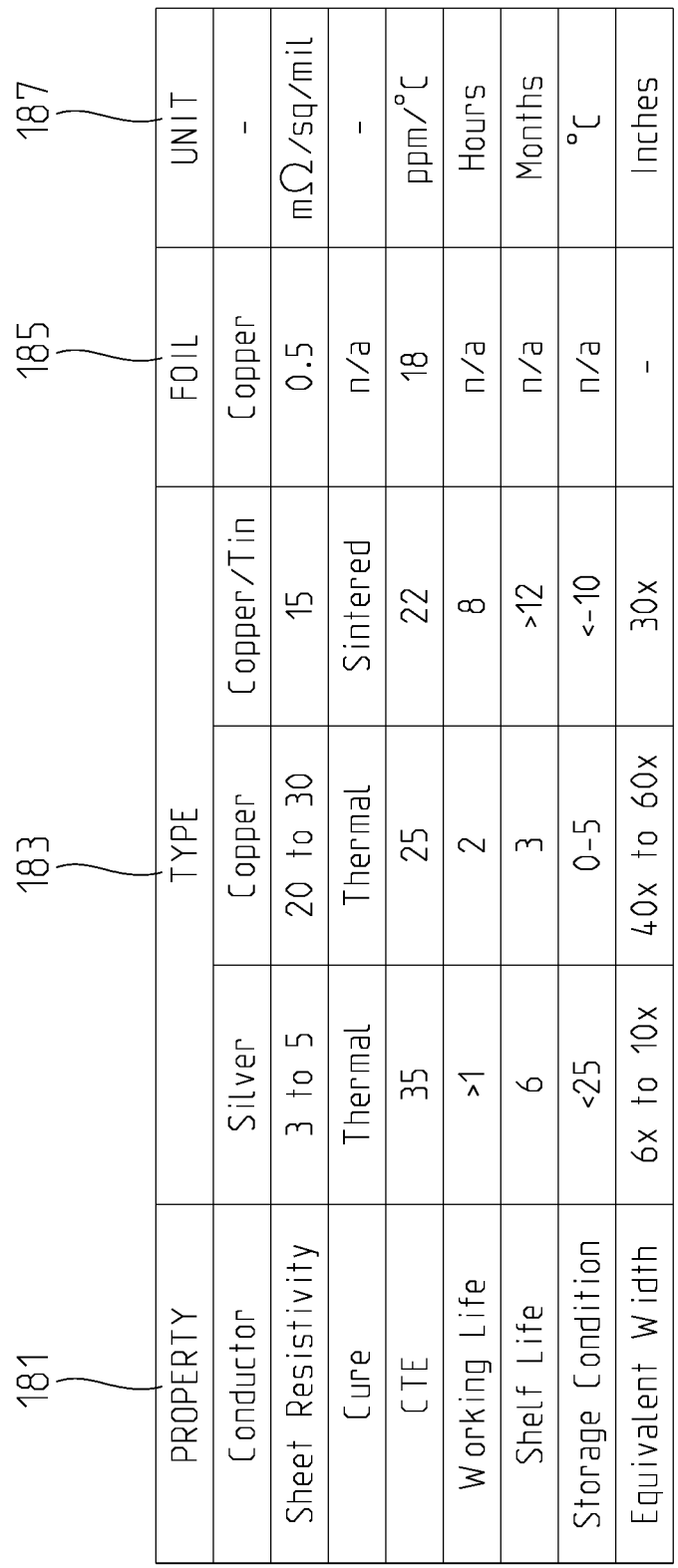
FIG. 7 shows another table showing various properties associated with different electrical conductive materials used with exemplary embodiments of the invention.

Referring to FIG. 6, a variety of properties 171 can be considered in selecting materials used in various embodiments. Properties 171 are shown such as dielectric constant, dissipation factor, dielectric strength, water absorption, melt temperature, flame retardant, CTE(Z), etc. are examined with respect to materials or parameters such as FR4 173, Nylon 12 175, ABS 177, and units 179 associated with the various values. With respect to FIG. 7, additional properties 181 can include conductor material, sheet resistivity, cure, CTE, working life, shelf life, storage condition and equivalent width are provided with respect to various types of conductors 183 such as silver, copper, copper/tin as well as foil 185, which are shown with their respective units 187 for exemplary numerical values listed in FIG. 7.

Figure 8A:
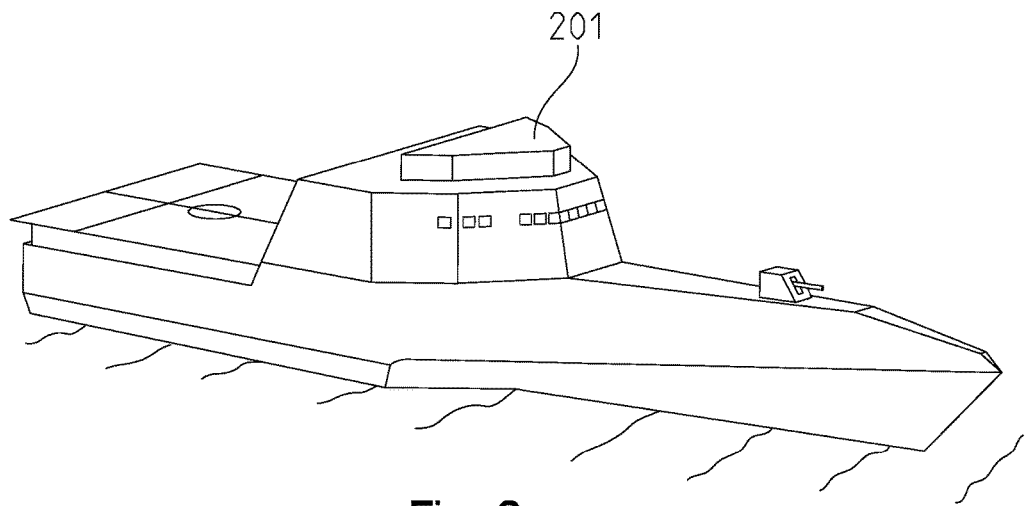
FIG. 8a shows an image of a POU location such as a ship.
Figure 8B:
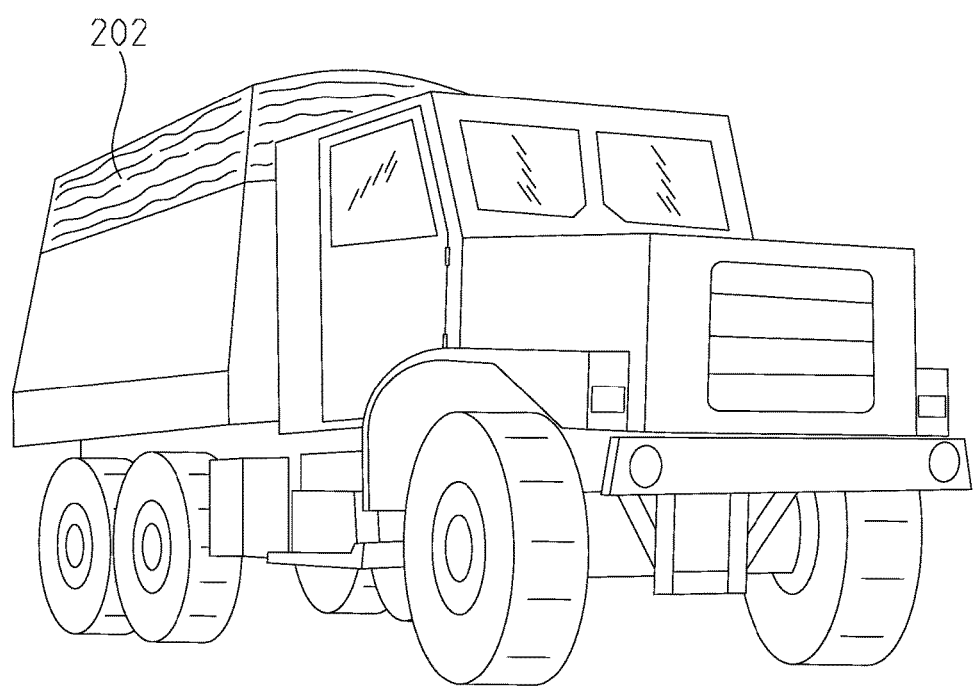
FIG. 8b shows an image of a POU location such as a vehicle.
Figure 9:
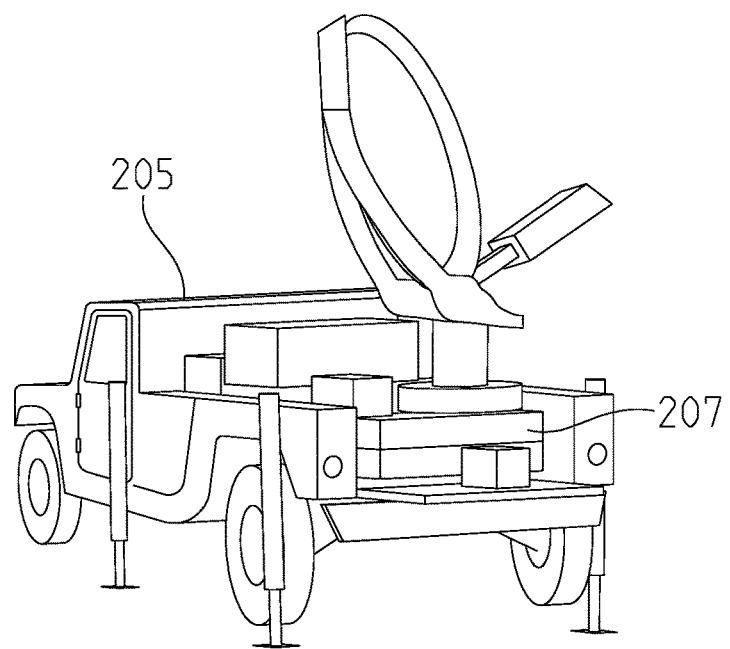
FIG. 9 shows an image of another POU location such as a vehicle with communications, illustrating transmission of design data to POU for manufacturing.

FIGS. 8a, 8b and 9 show POU platforms such as a ship 201 in FIG. 8a or vehicle 202 in FIGS. 8b and 205 in FIG. 9 where an embodiment of the invention, e.g. 207, can be mounted, used, with specific application at a particular POU.

Figure 10:
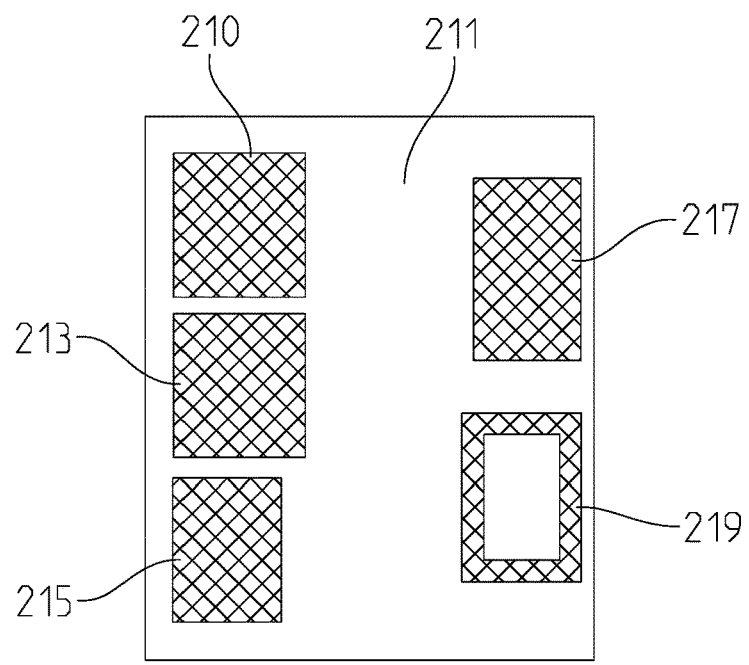
FIG. 10 shows an exemplary layout of equipment in an accordance with an exemplary embodiment of the invention.
Figure 11C:
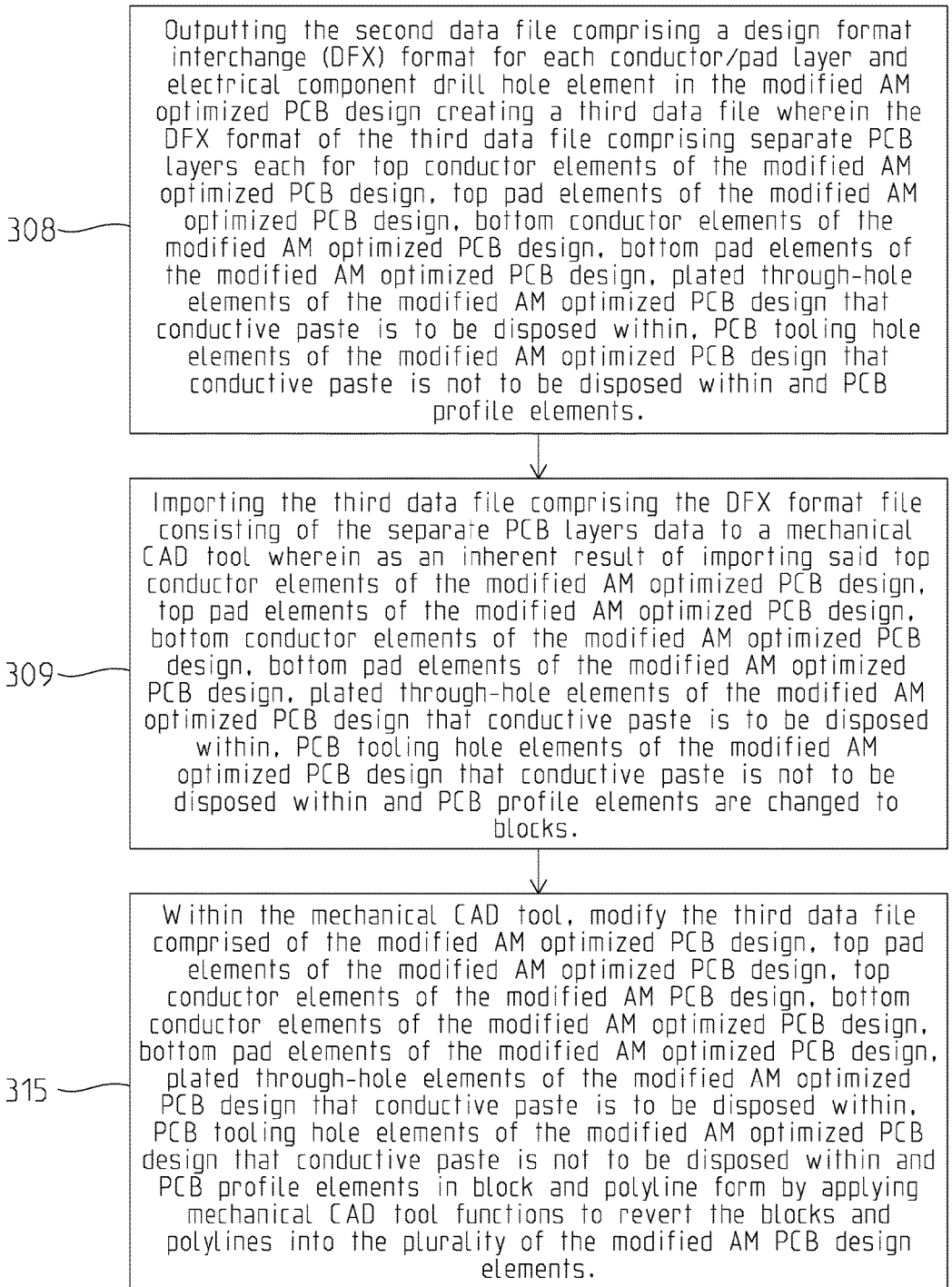
Figure 11D:
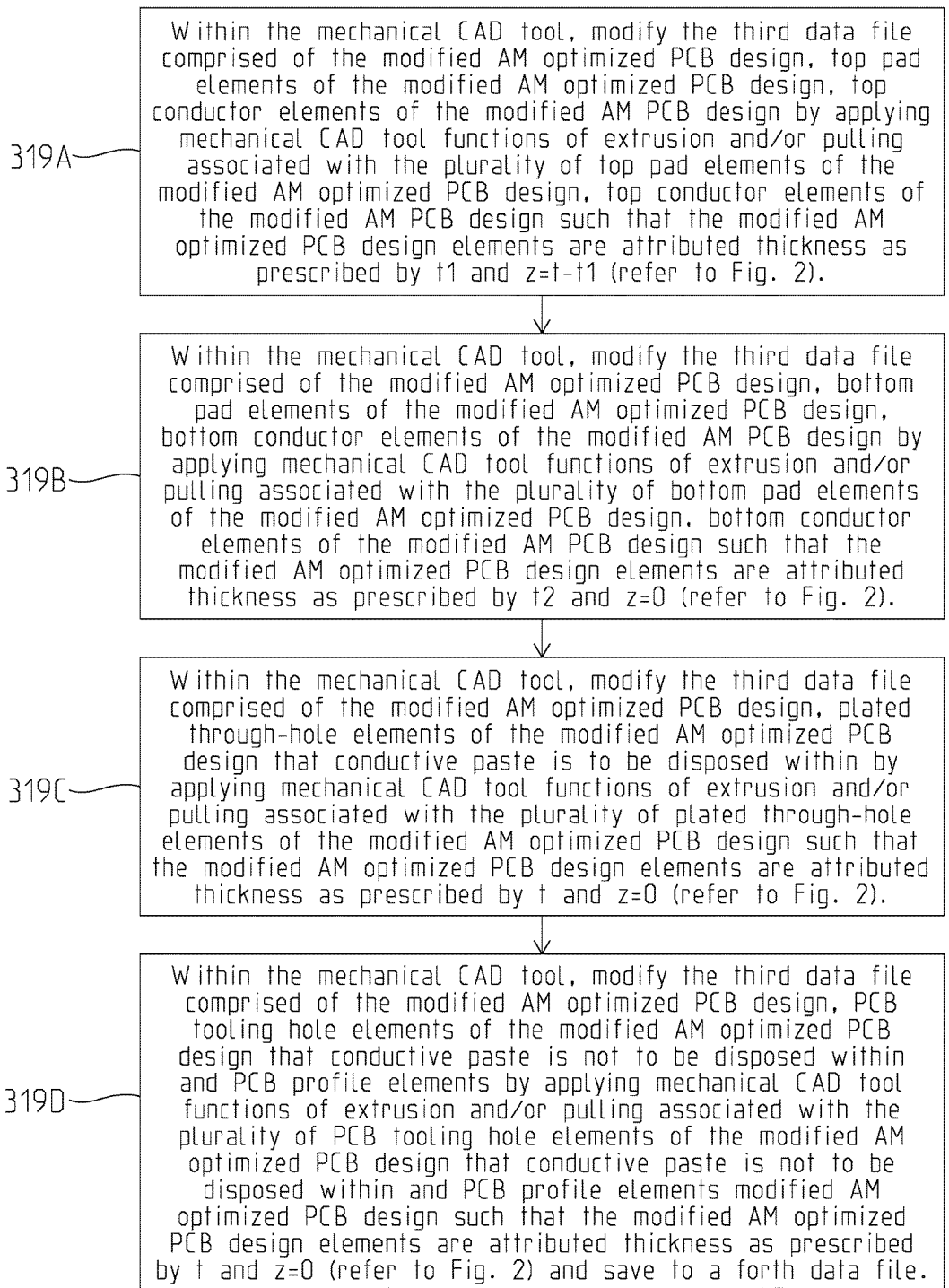
Figure 11E:
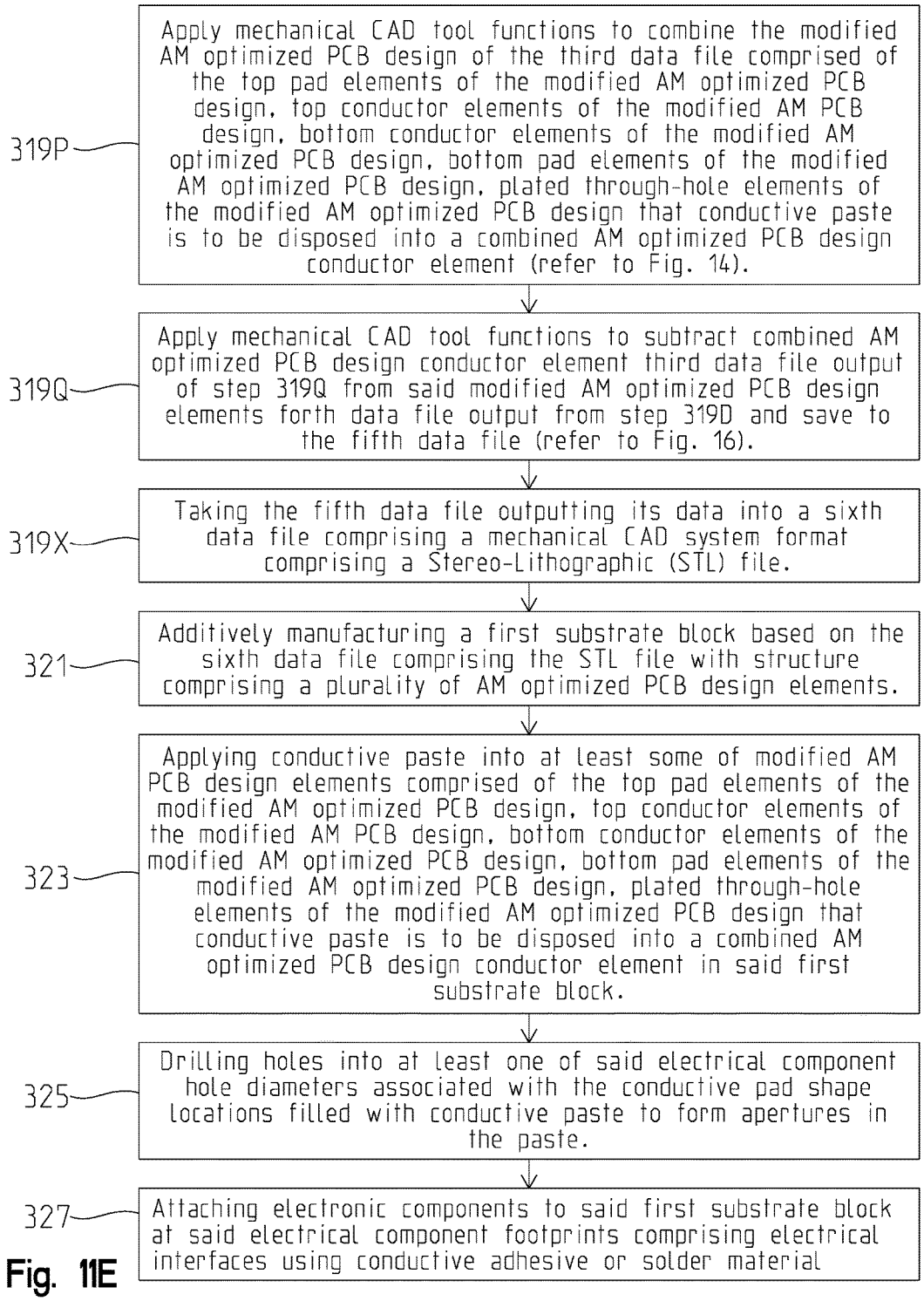

Referring to FIG. 10, an exemplary layout of equipment in an accordance with an exemplary embodiment of the invention illustrates a compact area 211 where an exemplary AM 3D printer 210, curing and/or post process oven 213, print equipment 215, drill machine 217 and storage unit 219 can be contained in an area less than 250 square feet in contrast to existing facilities which requires an area of thousands of square feet, e.g. 16,000 square feet. Some benefits or aspects to this embodiment illustrates an ability to manufacture a PCB at POU locations where space and material availability are limited and where mobility of a non-stationary platform is necessary such as, for example, locations as illustrated in FIGS. 8a, 8b and 9. FIG. 8a illustrates shipboard installation, 201 where size, weight and material storage availability is limited and where mobility such that the traditional PCB manufacturing methods of FIG. 1 would not be possible. FIG. 8b illustrates the application of a layout as applied to a ground mobile system, 202 where the layout illustrated in FIG. 10 may be utilized in a moving vehicle. Of critical importance in some embodiments can include an ability of embodiments of the invention to be utilized in a compact, mobile environment and serve multipurpose point of use manufacturing roles whereas the prior art utilizes equipment and materials (i.e. tanks filled with reactive liquid chemistry) not amiable to installment in a space limited, mobile POU environments. Additionally regarding FIG. 10, exemplary AM 3D printer 210 and curing and/or post process oven 213 can be utilized for a variety of machine part fabrication not dedicated to manufacture of a PCB providing flexibility of use for, e.g., the layout of FIG. 10.

Referring to FIGS. 11A-11E, an exemplary process for conversion of PCB CAD software data output into an STP file for use in forming a PCB substrate. Step 303: Create a first printed circuit board (PCB) design with electronic CAD tools on a PCB design and manufacturing computer (PCB-DMC) with a software read/write hard drive, display, input/output system, processor, etc at a point of use (POU) or a remote location and saving resulting first data into a first data file (PCB data e.g., a Gerber file such as a RS274X, ODB++, or IPC-2581 formats), comprising a plurality of first data including electrical component footprints comprising electrical interfaces and PCB design elements comprising interconnection lists (net list), pad stacks, the PCB design profile geometry including the electrical component footprints (e.g., X, Y locations of conductive pad and conductor line shapes), and electrical component hole diameters associated with the conductive pad shape locations. Step 305: At the POU, executing CAM software and generating a second data and second data file comprising the first data in said first data file to a computer aided manufacturing (CAM) software, e.g., (CAM 350 by Downstream, Genesis by Valor, etc used for generating, designing, and manipulating PCB data) on the PCBDMC and then executing the CAM software on said first data, said CAM software comprising a Design Rule Check (DRC) and a Design for Manufacturability (DFM) analysis software comprising a plurality of DRC rules and DFM rules adapted to search for specified or predetermined PCB design elements associated with one or more PCB additive manufacturing (AM) design flaws or risks in one or more DRC and DFM rules in said first data (e.g., if A and B AM PCB element(s) design flaws are matched in the first data, then generate one or more DRC or DFM flags comprising one or more specific AM design risk or flaw warning and accompanying said PCB design elements triggering the rule execution) where the CAM software rules are executed by a rule engine in said DRC and DFM analysis software on said first data, the CAM software generating said second data comprising said one or more design risk or flaw warnings associated with respective first data PCB elements having said one or more design risk or flaws, wherein processing can continue either by reopening said first data file in said CAD tools and altering the first data to change the first PCB design to eliminate the design risk or flaws then repeating step 305 or executing the CAM software that further comprises a module that provides a user interface to enable changes to the first data file to eliminate the design risks or flaw warnings, then generating a second data file comprising a modified AM optimized PCB design including said altered first data having first PCB elements with design risks or flaws removed comprising information and file elements such as shown in, e.g., FIG. 13. Step 307: Panelizing and saving said modified AM optimized PCB design comprising, e.g., elements shown or associated with elements in FIG. 13, for manufacturing with an AM system (step and repeat parts in an array structure optimizing utilization) using the CAM software on the PCBDMC so as to place the modified AM optimized PCB design elements on different AM plate sections of the AM system into the second data file. Step 308: Outputting the second data file comprising a DFX format for each conductor/pad layer and electrical component drill hole element in the modified AM optimized PCB design creating a third data file wherein the DFX format of the third data file comprising separate PCB layers each for top conductor elements of the modified AM optimized PCB design, top pad elements of the modified AM optimized PCB design, bottom conductor elements of the modified AM optimized PCB design, bottom pad elements of the modified AM optimized PCB design, plated through-hole elements of the modified AM optimized PCB design that conductive paste is to be disposed within, PCB tooling hole elements of the modified AM optimized PCB design that conductive paste is not to be disposed within and PCB profile elements. Step 309: Importing the third data file comprising the DFX format file consisting of the separate PCB layers data to a mechanical CAD tool wherein as an inherent result of importing said top conductor elements of the modified AM optimized PCB design, top pad elements of the modified AM optimized PCB design, bottom conductor elements of the modified AM optimized PCB design, bottom pad elements of the modified AM optimized PCB design, plated through-hole elements of the modified AM optimized PCB design that conductive paste is to be disposed within, PCB tooling hole elements of the modified AM optimized PCB design that conductive paste is not to be disposed within and PCB profile elements are changed to blocks. Step 315: Within the mechanical CAD tool, modify the third data file comprised of the modified AM optimized PCB design, top pad elements of the modified AM optimized PCB design, top conductor elements of the modified AM PCB design, bottom conductor elements of the modified AM optimized PCB design, bottom pad elements of the modified AM optimized PCB design, plated through-hole elements of the modified AM optimized PCB design that conductive paste is to be disposed within, PCB tooling hole elements of the modified AM optimized PCB design that conductive paste is not to be disposed within and PCB profile elements in block and polyline form by applying mechanical CAD tool functions to revert the blocks and polylines into the plurality of the modified AM PCB design elements. Step 319A: Within the mechanical CAD tool, modify the third data file comprised of the modified AM optimized PCB design, top pad elements of the modified AM optimized PCB design, top conductor elements of the modified AM PCB design by applying mechanical CAD tool functions of extrusion and/or pulling associated with the plurality of top pad elements of the modified AM optimized PCB design, top conductor elements of the modified AM PCB design such that the modified AM optimized PCB design elements are attributed thickness as prescribed by t1 and z=t–t1 (refer to FIG. 2). Step 319B: Within the mechanical CAD tool, modify the third data file comprised of the modified AM optimized PCB design, bottom pad elements of the modified AM optimized PCB design, bottom conductor elements of the modified AM PCB design by applying mechanical CAD tool functions of extrusion and/or pulling associated with the plurality of bottom pad elements of the modified AM optimized PCB design, bottom conductor elements of the modified AM PCB design such that the modified AM optimized PCB design elements are attributed thickness as prescribed by t2 and z=0 (refer to FIG. 2). Step 319C: Within the mechanical CAD tool, modify the third data file comprised of the modified AM optimized PCB design, plated through-hole elements of the modified AM optimized PCB design that conductive paste is to be disposed within by applying mechanical CAD tool functions of extrusion and/or pulling associated with the plurality of plated through-hole elements of the modified AM optimized PCB design such that the modified AM optimized PCB design elements are attributed thickness as prescribed by t and z=0 (refer to FIG. 2). Step 319D: Within the mechanical CAD tool, modify the third data file comprised of the modified AM optimized PCB design, PCB tooling hole elements of the modified AM optimized PCB design that conductive paste is not to be disposed within and PCB profile elements by applying mechanical CAD tool functions of extrusion and/or pulling associated with the plurality of PCB tooling hole elements of the modified AM optimized PCB design that conductive paste is not to be disposed within and PCB profile elements modified AM optimized PCB design such that the modified AM optimized PCB design elements are attributed thickness as prescribed by t and z=0 (refer to FIG. 2) and save to a forth data file. Step 319P: Apply mechanical CAD tool functions to combine the modified AM optimized PCB design of the third data file comprised of the top pad elements of the modified AM optimized PCB design, top conductor elements of the modified AM PCB design, bottom conductor elements of the modified AM optimized PCB design, bottom pad elements of the modified AM optimized PCB design, plated through-hole elements of the modified AM optimized PCB design that conductive paste is to be disposed into a combined AM optimized PCB design conductor element (refer to FIG. 14). Step 319Q: Apply mechanical CAD tool functions to subtract combined AM optimized PCB design conductor element third data file output of step 319Q from said modified AM optimized PCB design elements forth data file output from step 319D and save to the fifth data file (refer to FIG. 16). Step 319X: Taking the fifth data file outputting its data into a sixth data file comprising a mechanical CAD system format comprising a Stereo-Lithographic (STL) file. Step 321: Additively manufacturing a first substrate block based on the sixth data file comprising the STL file with structure comprising a plurality of AM optimized PCB design elements. Step 323: Applying conductive paste into at least some of modified AM PCB design elements comprised of the top pad elements of the modified AM optimized PCB design, top conductor elements of the modified AM PCB design, bottom conductor elements of the modified AM optimized PCB design, bottom pad elements of the modified AM optimized PCB design, plated through-hole elements of the modified AM optimized PCB design that conductive paste is to be disposed into a combined AM optimized PCB design conductor element in said first substrate block Step 325: Drilling holes into at least one of said electrical component hole diameters associated with the conductive pad shape locations filled with conductive paste to form apertures in the paste. Step 327: Attaching electronic components to said first substrate block at said electrical component footprints comprising electrical interfaces using conductive adhesive or solder material.

Figure 12A:
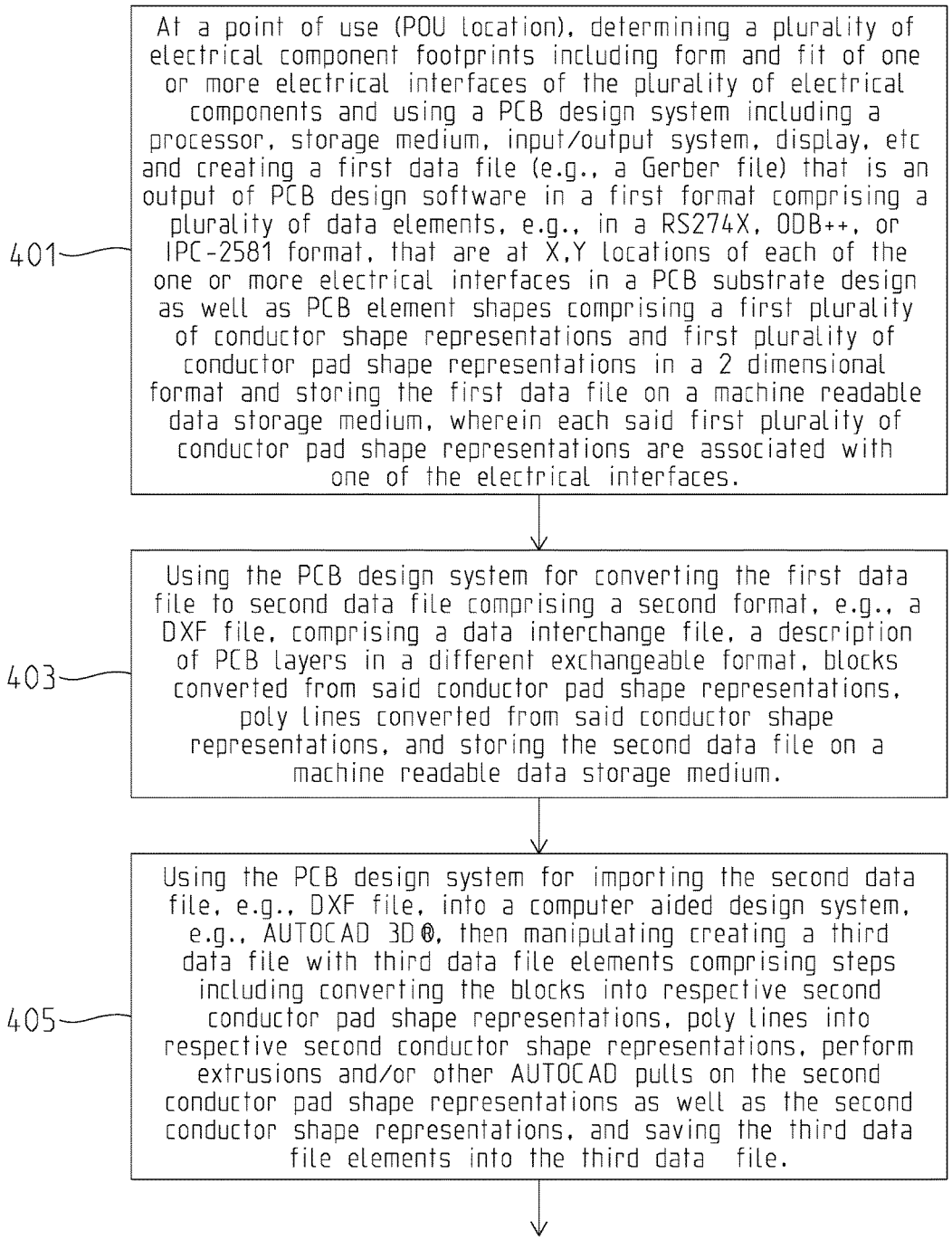
FIGS. 12A-12C show another exemplary process in accordance with aspects of an exemplary embodiment of the invention.
Figure 12B:
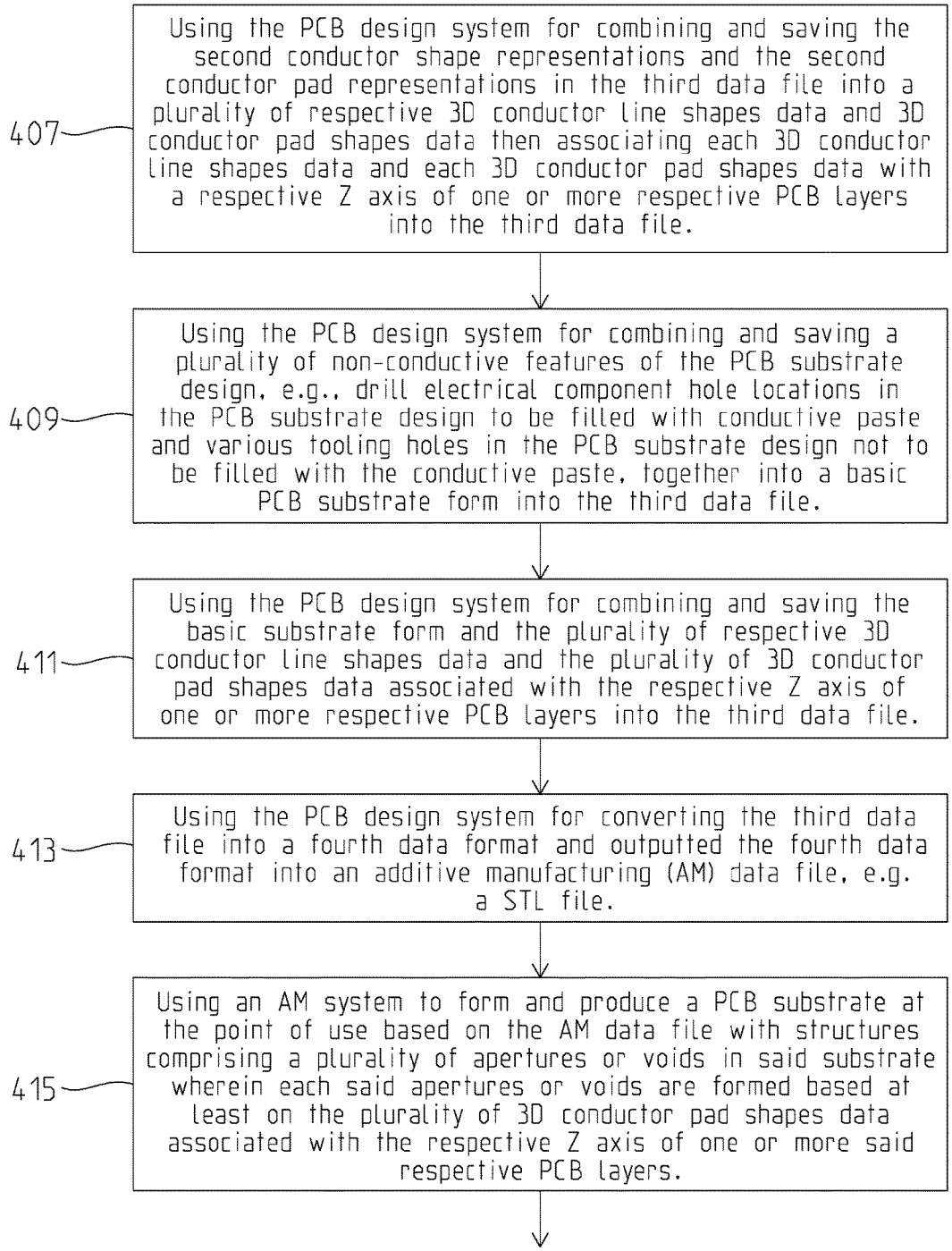
Figure 12C:
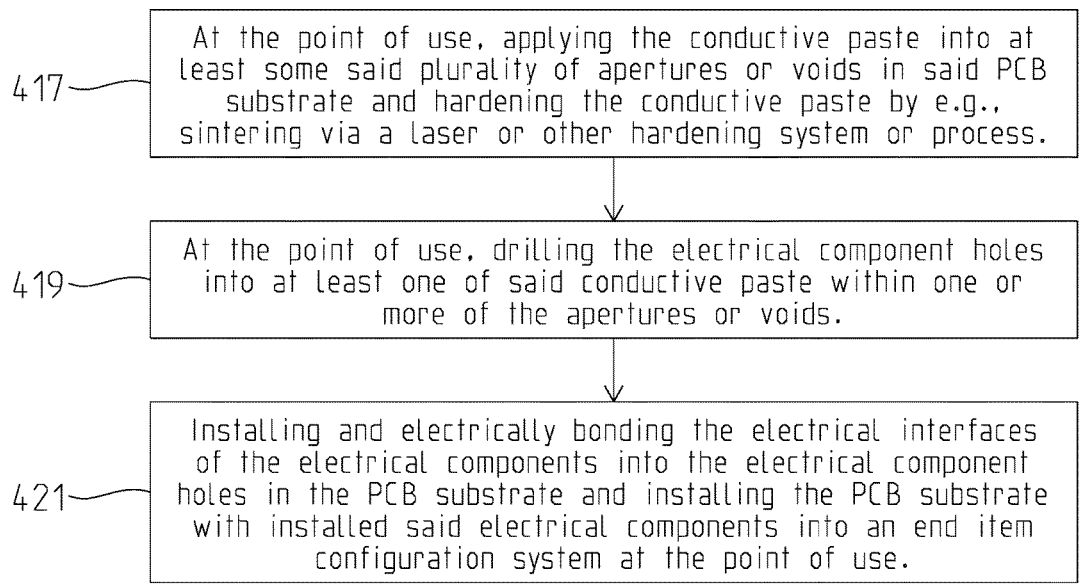

Referring to FIG. 12A, Step 401: At a point of use (POU location), determining a plurality of electrical component footprints including form and fit of one or more electrical interfaces of the plurality of electrical components and using a PCB design system including a processor, storage medium, input/output system, display, etc and creating a first data file (e.g., a Gerber file) that is an output of PCB design software in a first format comprising a plurality of data elements, e.g., in a RS274X, ODB++, or IPC-2581 format, that are at X, Y locations of each of the one or more electrical interfaces in a PCB substrate design as well as PCB element shapes comprising a first plurality of conductor shape representations and first plurality of conductor pad shape representations in a 2 dimensional format and storing the first data file on a machine readable data storage medium, wherein each said first plurality of conductor pad shape representations are associated with one of the electrical interfaces. Step 403: Using the PCB design system for converting the first data file to second data file comprising a second format, e.g., a DXF file, comprising a data interchange file, a description of PCB layers in a different exchangeable format, blocks converted from said conductor pad shape representations, poly lines converted from said conductor shape representations, and storing the second data file on a machine readable data storage medium. Step 405: Using the PCB design system for importing the second data file, e.g., DXF file, into a computer aided design system, e.g., AUTOCAD 3D®, then manipulating creating a third data file with third data file elements comprising steps including converting the blocks into respective second conductor pad shape representations, poly lines into respective second conductor shape representations, perform extrusions and/or other AUTOCAD pulls on the second conductor pad shape representations as well as the second conductor shape representations, and saving the third data file elements into the third data file. Referring to FIG. 12B: Step 407: Using the PCB design system for combining and saving the second conductor shape representations and the second conductor pad representations in the third data file into a plurality of respective 3D conductor line shapes data and 3D conductor pad shapes data then associating each 3D conductor line shapes data and each 3D conductor pad shapes data with a respective Z axis of one or more respective PCB layers into the third data file. Step 409: Using the PCB design system for combining and saving a plurality of non-conductive features of the PCB substrate design, e.g., drill electrical component hole locations in the PCB substrate design to be filled with conductive paste and various tooling holes in the PCB substrate design not to be filled with the conductive paste, together into a basic PCB substrate form into the third data file. Step 411: Using the PCB design system for combining and saving the basic substrate form and the plurality of respective 3D conductor line shapes data and the plurality of 3D conductor pad shapes data associated with the respective Z axis of one or more respective PCB layers into the third data file. Step 413: Using the PCB design system for converting the third data file into a fourth data format and outputted the fourth data format into an additive manufacturing (AM) data file, e.g. a STL file. Step 415: Using an AM system to form and produce a PCB substrate at the point of use based on the AM data file with structures comprising a plurality of apertures or voids in said substrate wherein each said apertures or voids are formed based at least on the plurality of 3D conductor pad shapes data associated with the respective Z axis of one or more said respective PCB layers. Referring to FIG. 12C: Step 417: At the point of use, applying the conductive paste into at least some said plurality of apertures or voids in said PCB substrate and hardening the conductive paste by e.g., hardening the conductive paste by, e.g., sintering via a laser or other hardening system or process. Step 419: At the point of use, drilling the electrical component holes into at least one of said conductive paste within one or more of the apertures or voids. Step 421: Installing and electrically bonding the electrical interfaces of the electrical components into the electrical component holes in the PCB substrate and installing the PCB substrate with installed said electrical components into an end item configuration system at the point of use.

Figure 13:
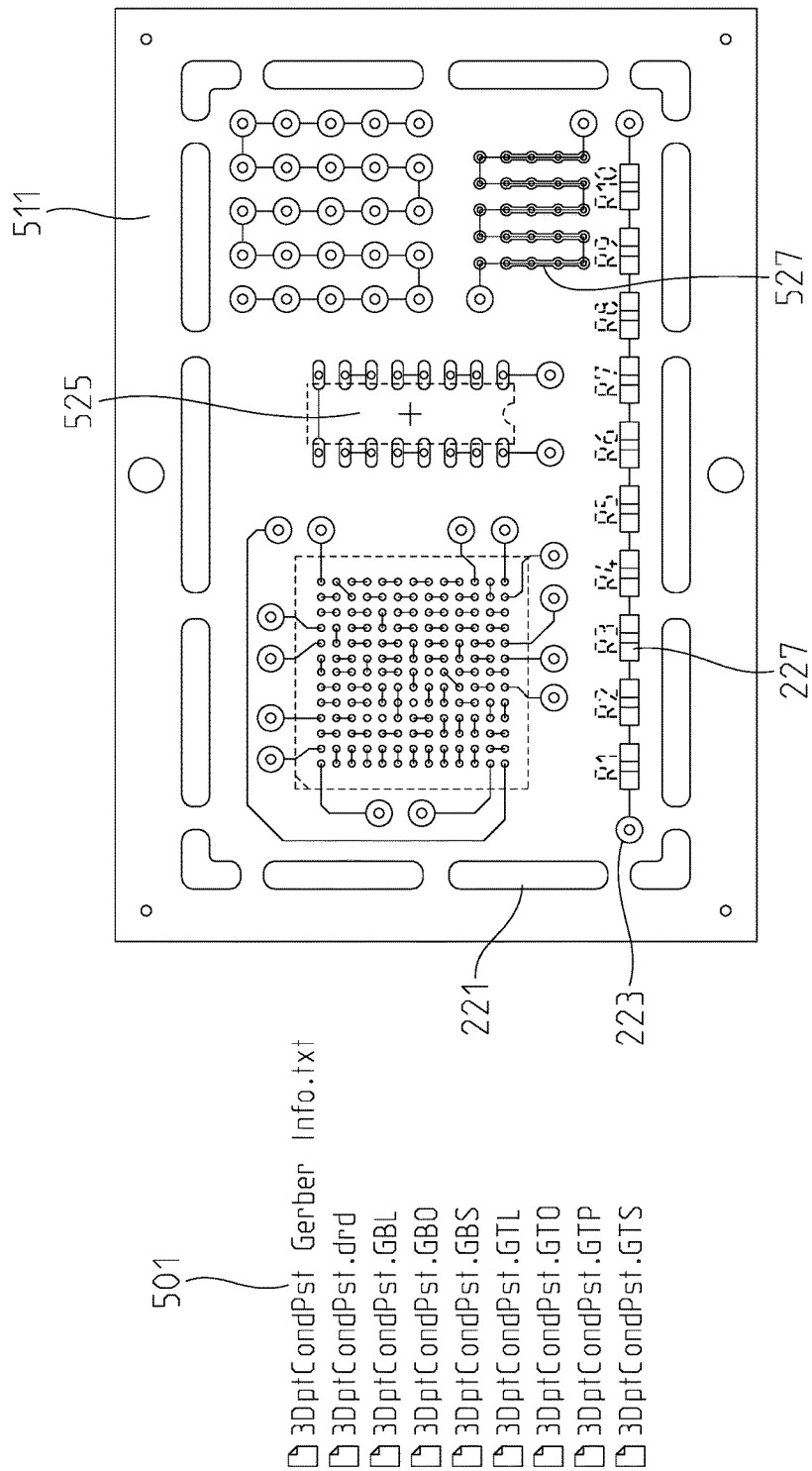
FIG. 13 shows an exemplary design output from PCB computer aided design (CAD) software which illustrates one exemplary data file structure (e.g., RS274X) for an exemplary three dimensional (3D) PCB design.

Referring to FIG. 13 illustrates a typical output of a simplified view of a PCB CAD design software with file structure created in accordance with one embodiment of the invention. Various files 501 are shown which can be used in an exemplary embodiment are shown on the left hand side of the figure. A substrate 511 is shown with devices 525, 227, installed with electrical components. Layers, pads, conductors, drill sites, and profile are shown.

Figure 14:
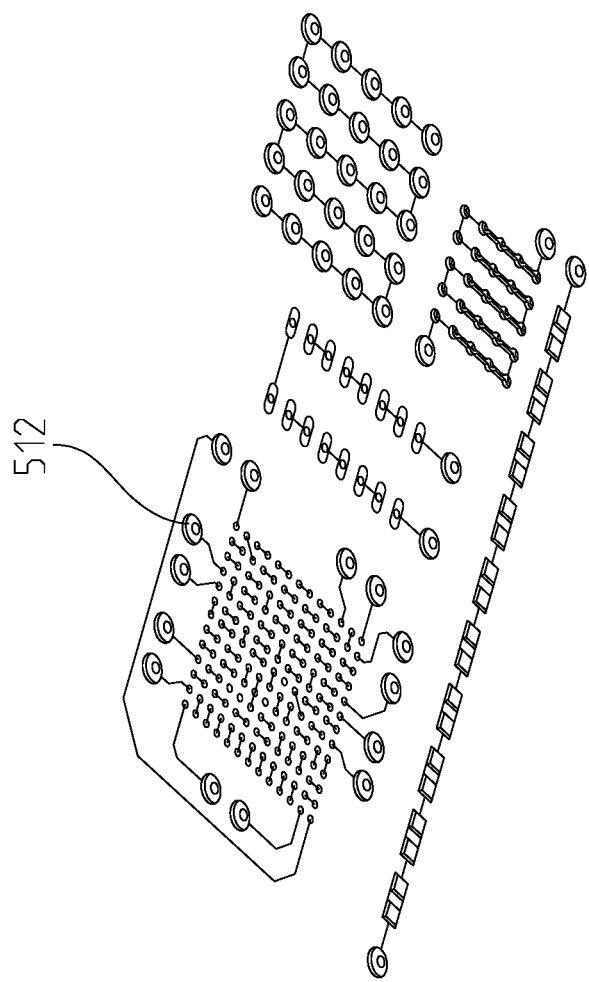
FIG. 14 shows an exemplary view of a 3D conductor layout that is a part of an exemplary 3D PCB design created in part using exemplary FIG. 11B processes (e.g., FIG. 11B, step 319J) and exemplary PCB CAD software derived from or based on the exemplary 3D PCB design shown in FIG. 13.

Referring to FIG. 14 shows an exemplary view of a graphical depiction of a combined 3D conductor model file. The view included conductive structures e.g., 512.

Figure 15:
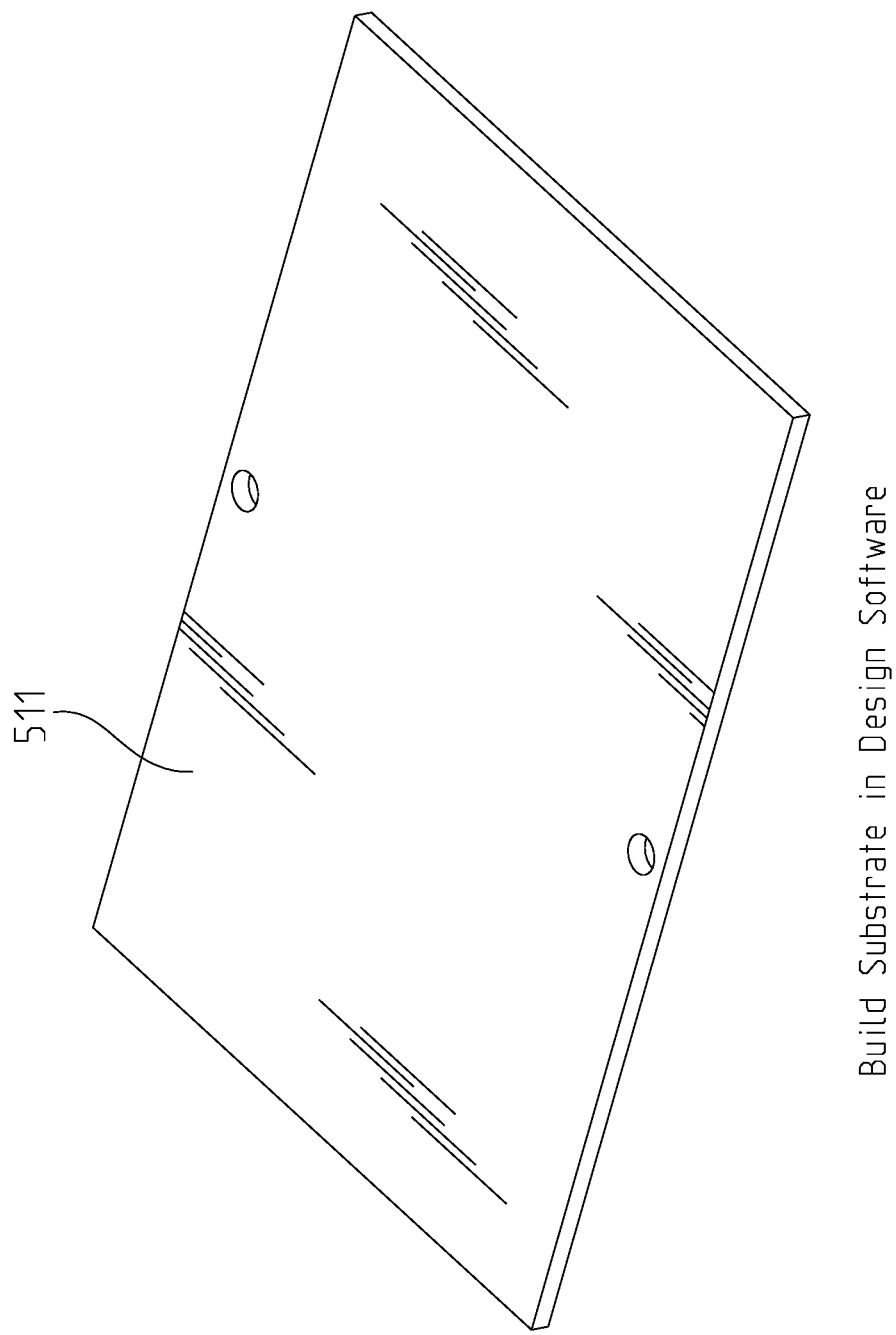
FIG. 15 shows an exemplary view of a 3D substrate associated with exemplary 3D PCB design, e.g., FIG. 13 substrate, created via exemplary processing, e.g., in FIG. 11C step 319V.

Referring to FIG. 15 shows an exemplary view of one substrate 3D model file modeling a substrate 511.

Figure 16A:
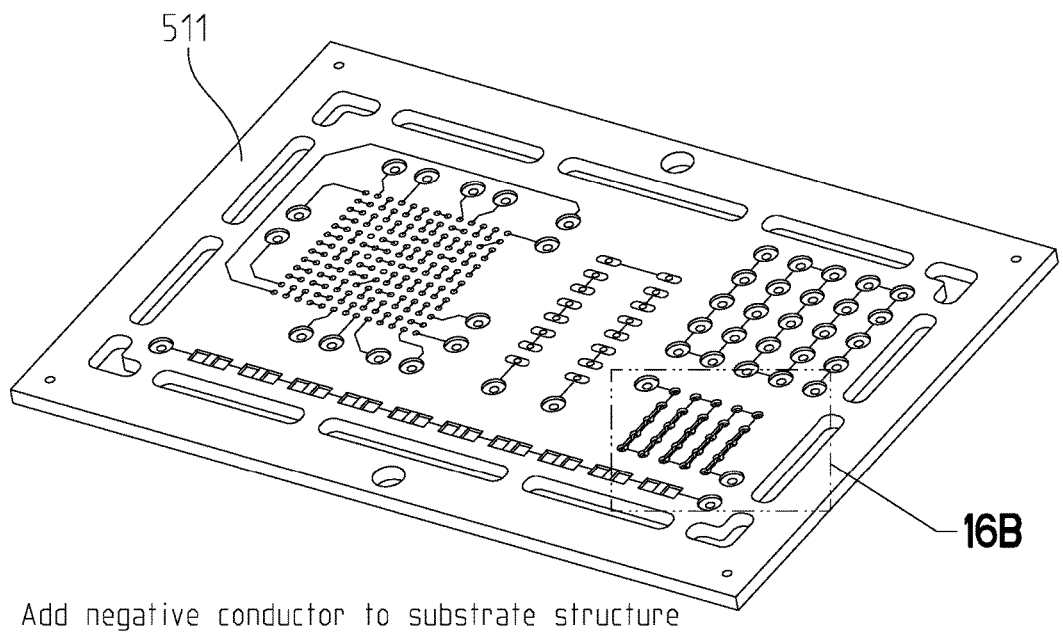
FIG. 16 shows an exemplary view of an exemplary 3D PCB structure created by combined elements of FIG. 14 and FIG. 15 where the exemplary 3D PCB structure is described and provided as a stereo-lithographic (STL) file output to the AM system, e.g., an AM printer.
Figure 16B:
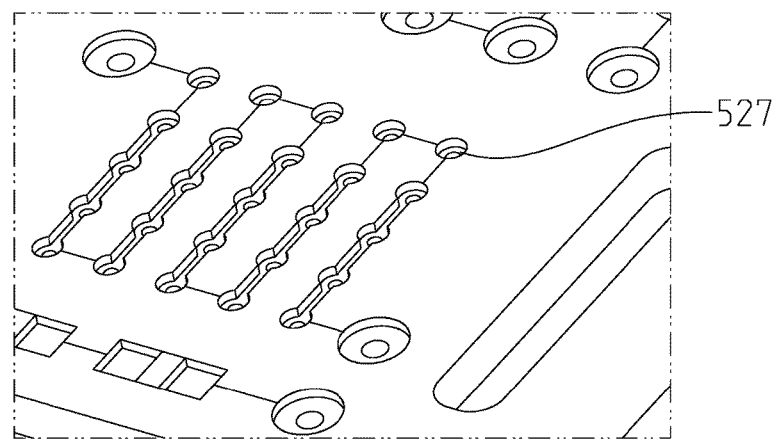

Referring to FIG. 16 shows an exemplary view of the 3D PCB model created with an exemplary process by combining the negative of the combined 3D conductor file with the substrate 511 3D model file.

Although the invention has been described in detail with reference to certain preferred embodiments, variations and modifications exist within the spirit and scope of the invention as described and defined in the following claims.

The invention claimed is:

1. A method of manufacturing comprising:
   determining a plurality of design attributes for a printed circuit board (PCB) that fulfills requirements at a predetermined point of use (POU) where the PCB will be manufactured and installed or used and recording said plurality of design attributes on a first recording medium section;
   providing a first and second design software system, an additive manufacturing (AM) system comprising at least a first laser, and an oven for receiving and processing the PCB as it is manufactured at the POU on a mobile platform;
   creating a first PCB design based on said plurality of design attributes from said first recording medium using the first design software and saving an output from said first design software in a first data file within a second recording medium section comprising a plurality of two dimensional (2D) PCB structure data attributes;
   altering the first data file stored on the second recording medium to add three dimensional (3D) PCB structure data attributes to the first data file contents and saving the altered first data file contents into a second data file on a third recording medium;
   inputting the second data file into the AM system and manufacturing a substrate using the AM system based on the second data file, said substrate comprising a plurality of apertures comprising apertures associated with electrical conductive paths and pads;
   applying a conductive paste to said plurality of apertures associated with said electrical conductive paths and pads;
   applying pressure on said conductive paste to force said paste into all areas of said apertures associated with said electrical conductive paths and pads;
   placing said substrate into said oven during a specific temperature rise, hold and fall profile under said pressure to perform post processing on said substrate and said paste to further form said substrate and paste into a predetermined hardened conductive paste structures;
   drilling a plurality of holes in at least some of said hardened conductive paste structures within said apertures associated with said electrical conductive paths and pads to enable later installation of one or more electrical components in electrical contact with said hardened conductive paste structures and said electrical conductive paths and pads;
   installing said plurality of electrical components into said holes in said hardened conductive paste structures or in contact with said electrical paths or pads; and
   installing said PCB having said plurality of electrical components into an end item electrical system at said POU.

2. The method of claim 1, wherein an exemplary embodiment of said mobile platform is a ship or vehicle.

3. The method of claim 1, wherein an exemplary embodiment of said mobile platform is combined with a support structure.

4. The method of claim 1, wherein an alternative exemplary embodiment is applying paste through a pneumonic device to fill voids with said paste.

5. A method of manufacturing a printed circuit board (PCB) at a point of use (POU) comprising:
   determining a plurality of attributes for a PCB at a POU comprising PCB attributes required for a predetermined plurality of electrical components selected for installation at said POU and storing said plurality of attributes into a data storage system;
   retrieving said plurality of attributes for said PCB and creating a two dimensional (2D) PCB design portion data comprising a one or more 2D PCB structures based on said plurality of attributes and storing said 2D PCB design portion data into a first data file stored on a first recording medium section;
   determining a three dimensional (3D) PCB design portion comprising one or more 3D PCB structures based on said 2D PCB design portion from said first data file and said plurality of attributes structured for said PCB comprising one or more steps of associating said one or more 3D PCB structures with said one or more 2D PCB structures and saving said 3D PCB design into a second data file stored on a second recording medium section;
   inputting the second data file into an additive manufacturing (AM) system adapted to manufacture structures comprising PCB substrates and using said AM system to manufacture one or more PCB substrates comprising a plurality of apertures associated with coupling said plurality of electrical components with said one or more PCB substrates;
   applying a plurality of portions of conductive paste into said apertures in said one or more PCB substrates;
   hardening said plurality of portions of conductive paste using a heating system said one or more PCB substrates are placed in proximity with;
   using a drilling system and drilling holes into said plurality of portions of hardened conductive paste configured to receive said plurality of electrical components to be installed in contact with said conductive paste;
   installing said plurality of electrical components into said holes created by said drilling system; and
   installing said PCB into end item electrical system at said POU.

6. A method as in claim 5, wherein said step of determining a plurality of attributes for said PCB, said step of creating a two dimensional (2D) PCB design portion data, said step of determining a three dimensional (3D) PCB design portion are performed at a different location than said POU and transmitted or communicated to an operator or into said AM system.

7. A method of manufacturing a printed circuit board (PCB) at a point of use (POU) comprising:
   determining a plurality of attributes for a PCB at a POU comprising PCB attributes required for a predetermined plurality of electrical components selected for installation at said POU and storing said plurality of attributes into a data storage system;
   retrieving said plurality of attributes for said PCB and creating a two dimensional (2D) PCB design portion data comprising a one or more 2D PCB structures based on said plurality of attributes and storing said 2D PCB design portion data into a first data file stored on a first recording medium section;
   determining a three dimensional (3D) PCB design portion comprising one or more 3D PCB structures based on said 2D PCB design portion from said first data file and said plurality of attributes structured for said PCB comprising one or more steps of associating said one or more 3D PCB structures with said one or more 2D PCB structures and saving said 3D PCB design portion into a second data file stored on a second recording medium section;
   inputting the second data file into an additive manufacturing (AM) system adapted to manufacture structures comprising PCB substrates and using said AM system to manufacture one or more PCB substrates comprising a plurality of apertures associated with coupling said plurality of electrical components with said one or more PCB substrates;

applying a plurality of portions of conductive paste into said apertures in said one or more PCB substrates:

hardening said plurality of portions of conductive paste using a heating system said one or more PCB substrates are placed in proximity with;

using a drilling system and drilling holes into said plurality of portions of hardened conductive paste configured to receive said plurality of electrical components to be installed in contact with said conductive paste;

installing said plurality of electrical components into said holes created by said drilling system; and installing said PCB into an end item electrical system at said POU;

wherein said step of determining a plurality of attributes for said PCB, said step of creating a two dimensional (2D) PCB design portion data, said step of determining a three dimensional (3D) PCB design portion are performed at a different location than said POU and transmitted or communicated to an operator or into said AM system.

8. A method of manufacturing a printed circuit board (PCB) at a point of use (POU) comprising:

forming a printed circuit board (PCB) substrate comprising a plurality of apertures, wherein each said plurality of apertures are determined and formed into said PCB substrate based on one or more electrical interface sections of one or more plurality of electrical components selected for coupling with said PCB substrate at a later assembly step, wherein said one or more electrical components and said PCB substrate are formed based on a predetermined end use at a point of use (POU), said predetermined end use comprises a plurality of functions associated with an electrical system including form, fit, and function attributes associated with said electrical system;

disposing a plurality of electrical paste sections into said plurality of apertures;

hardening said electrical paste sections;

drilling holes into said electrical paste sections configured to receive said one or more electrical interface sections; and installing said one or more electrical interface sections into said plurality of holes and electrically coupling said electrical interface sections with one or more electrical conductive paths formed onto or into said PCB substrate.

9. A process for manufacturing a printed circuit board (PCB) at a point of use (POU) using an additive manufacturing (AM) system comprising:

determining and designing a plurality of two dimensional (2D) forms, fits, and footprints of a plurality of electrical components with respect to a PCB electrical component interfacing design comprising laydown or placements and interfacing of the electrical components with respect to a PCB substrate including electrical interface locations of the electrical components with the PCB substrate, creating and associating a plurality of 2D conductive pad structures in a 2D PCB substrate design with the electrical interface locations for electrically interfacing the electrical components with the PCB substrate, creating and associating conductive lines connecting with the conductive pad structures in the PCB design, and saving the resulting 2D PCB design into a first data file in an electronic media storage system using a manufacturing system comprising a processor, communication system adapted for communicating with an external data communication network, the electronic media storage system including a PCB design software, one or more input/output systems, a processor for executing machine instructions including processes sequences from the PCB design software, and a display at a point of use or installation into an end component;

using a mechanical computer aided design (CAD) system on the manufacturing system to input the first data file into the mechanical CAD system and create a resulting three dimensional (3D) PCB design, convening the resulting 2D PCB design from the first data file into a 3D PCB design comprising a first plurality of 3D apertures or voids in the PCB substrate having shapes and geometries conforming to 3D representations of the conductive pad structures in the 2D PCB design that will be filled with a conductive paste in a later step, creating a second plurality of 3D apertures or voids in the PCB substrate associated with mechanical interfaces with the PCB substrate, then saving the resulting 3D PCB design into a second data file in the electronic media storage system, manufacturing the PCB substrate based on the resulting 3D PCB design in the second data file using an AM system at the POU comprising the first and second plurality of 3D apertures or voids;

disposing the conductive paste into the first plurality of apertures or voids and hardening the conductive paste and the POU;

drilling electrical interface holes into the conductive paste sized to the electrical interfaces of the electronic components using a drill at the POU;

installing the electrical components into the PCB substrate comprising inserting the electrical interfaces into respective drilled holes in the hardened conductive paste at the electrical component footprint locations to produce a completed PCB with installed said electrical components at the POU; and installing the completed PCB into an end use system at the POU.

* * * * *